United States Patent [19]

Gross et al.

[11] Patent Number: 5,137,323
[45] Date of Patent: Aug. 11, 1992

[54] DECORATIVE MOLDING AND METHOD OF MANUFACTURE

[75] Inventors: Michael G. Gross, Miami County; John D. Troutman, Montgomery County; Jack D. Young, Montgomery County, all of Ohio; Bruce F. Whitmer, Oakland County, Mich.

[73] Assignee: Creative Extruded Products Inc., Tipp City, Ohio

[21] Appl. No.: 684,251

[22] Filed: Apr. 12, 1991

[51] Int. Cl.$^5$ .............................................. B60J 10/04
[52] U.S. Cl. ......................................... 296/93; 52/208; 52/400
[58] Field of Search .................. 296/93, 146; 49/480, 49/481; 52/208, 397, 400

[56] References Cited

U.S. PATENT DOCUMENTS

| | | | |
|---|---|---|---|
| 3,705,470 | 12/1972 | Kent | 52/208 |
| 4,447,065 | 5/1984 | Dupuy et al. | 52/400 X |
| 4,720,936 | 1/1988 | Ellingson | 49/480 |
| 4,787,668 | 11/1988 | Kawase et al. | 52/400 X |
| 4,813,733 | 3/1989 | Gustafson et al. | 296/93 |
| 4,897,975 | 2/1990 | Artwick et al. | 52/208 |
| 4,933,032 | 6/1990 | Kunert | 52/208 X |
| 4,938,521 | 7/1990 | Kunert | 52/208 X |
| 4,950,019 | 8/1990 | Gross | 296/93 |

FOREIGN PATENT DOCUMENTS

| | | |
|---|---|---|
| 0249560 | 6/1987 | European Pat. Off. . |
| 3612923 | 10/1987 | Fed. Rep. of Germany . |
| 2565621 | 6/1984 | France . |
| 2582714 | 5/1986 | France . |
| 36176 | 3/1980 | Japan .................................... 296/93 |
| 34920 | 2/1984 | Japan .................................... 296/93 |
| 176818 | 9/1985 | Japan .................................... 296/93 |
| 301724 | 9/1954 | Switzerland .......................... 49/480 |
| 1299 | of 1902 | United Kingdom .................. 49/480 |
| 1348981 | 3/1974 | United Kingdom .................. 52/400 |

Primary Examiner—Margaret A. Focarino
Assistant Examiner—Gary C. Hoge
Attorney, Agent, or Firm—Reuben Wolk

[57] ABSTRACT

A decorative molding for motor vehicles, such as automobiles, for concealing the space between a body panel and an adjacent translucent member such as a window, a windshield, or a lamp cover, and also to minimize leakage of noise, water and dirt. The molding is an elongated polymeric member having a generally cylindrical foam strip which is continuously placed against a portion of the molding and bonded thereto, the strip thus providing a resilient seal for the molding when used between the body panel and the adjacent translucent member.

9 Claims, 1 Drawing Sheet

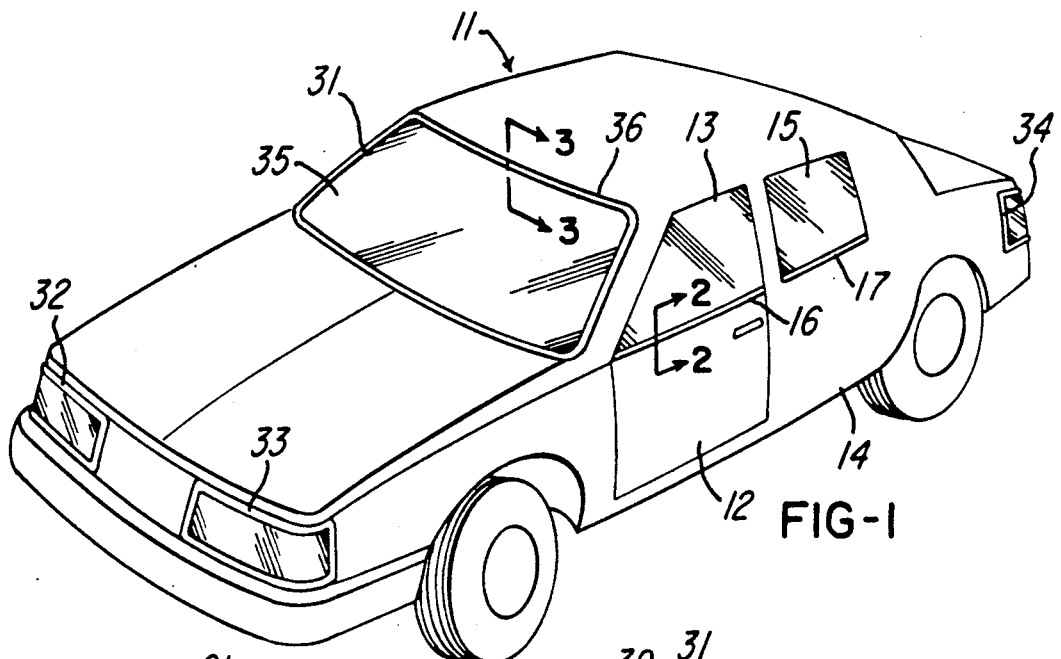
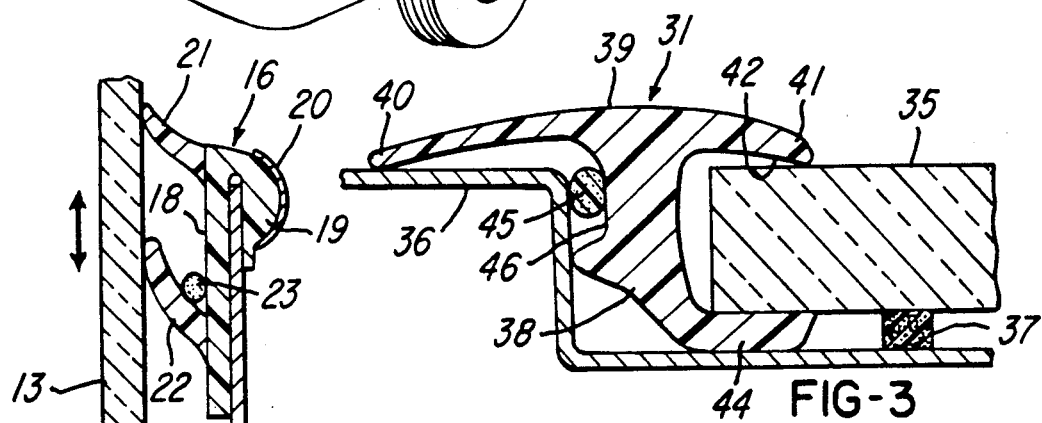
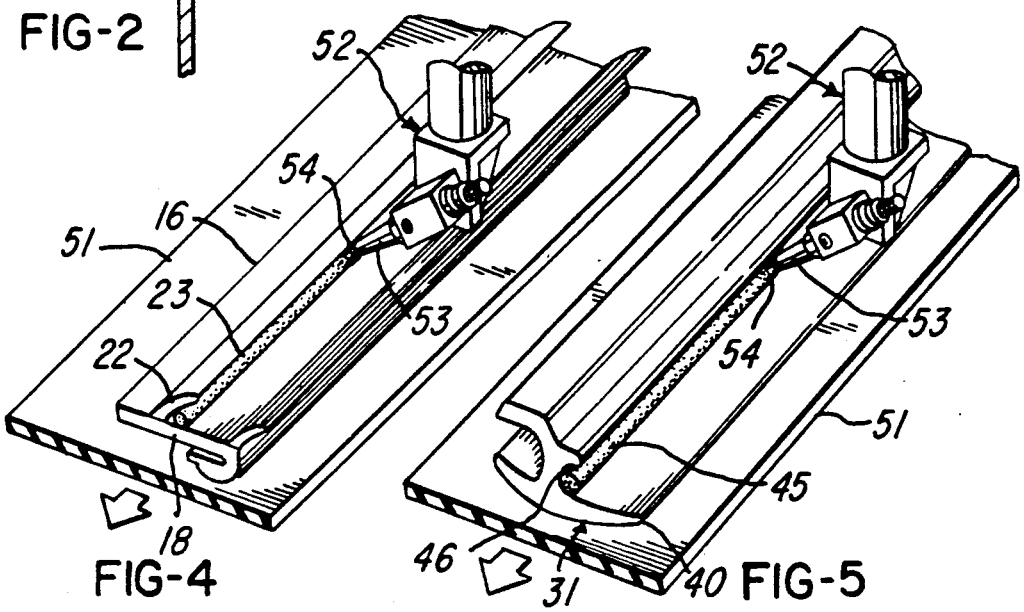

DECORATIVE MOLDING AND METHOD OF MANUFACTURE

BACKGROUND OF THE INVENTION

The present invention relates to a decorative molding for motor vehicle bodies, and may be used as a body side molding mounted on the body or door to apply pressure against a translucent member such as a movable or fixed side window. It may also be mounted on a body panel to serve as a reveal for retaining a fixed window such as a windshield or rear window and to conceal the space between the panel and the window, or mounted on the body adjacent a headlamp or tail lamp to serve as a closeout for the glass or plastic covers of the lamps. The molding reduces noise entering the vehicle, and keeps dirt and water out of the various areas.

PRIOR ART STATEMENT

It is known to form a body side molding strip, also known as a beltline seal, by mounting it on the body to contact a window in order to aply pressure against the window. Such strips are made of an expensive polymeric material, such as special rubbers, in order to avoid their taking a permanent set which would occur if less expensive elastomeric materials, such as polyvinyl chloride were used. This is a problem which the industry has attempted to solve. It is also known to form reveal moldings such as the type shown in U.S. Pat. No. 4,950,019 issued to Gross and U.S. Pat. No. 4,813,733 issued to Gustafson et al. Also illustrative are European Pat. No. 249560 (Joguet), French patent 2,565,621 (Lemenager et al), French patent 2,582,714 (Paudice et al), and German patent 3,612,923 (Feldmann). Of these patents, Feldmann illustrates the concept of a layer of adhesive (klebstoffschicht 14) which adheres the molding body 11 to the body 9. It is also known to apply to a molding a preformed gasket having an adhesive on one face to form a seal between the molding and the body panel.

SUMMARY OF THE INVENTION

The present invention provides for an improved molding which conceals the space between an automotive body panel and an adjacent translucent member, such as a transparent windshield or rear window or side window, or a glass or plastic headlamp or taillamp cover that is fully transparent or modified to duffuse light. The molding may be applied to the side of the vehicle as a beltline seal against a fixed or moveable window, as a reveal molding against a windshield or rear window, or as a closeout against a headlamp or tail lamp cover.

This is accomplished by providing a generally cylindrical resilient polymeric foam member which is continuously applied against a surface of a multi-surface molding in the form of a strip or bead, so that it is bonded to surface free of additional adhesive. In the use of the molding as a beltline seal, the foam strip provides a resilient cushion with segments of the molding to apply pressure against the window without causing the molding to take a permanent set which might otherwise occur if the molding were made of certain polymeric materials. In the use of the molding as a window reveal or a lamp cover closeout, the foam strip serves as a gasket seal directly against the body panel. The foam material may be applied directly to the appropriate surface of the molding and bonded thereto. In the use as a reveal molding or closeout, this eliminates the need for forming a separate gasket having an adhesive surface which must be bonded to the molding at a later time, possibly causing the gasket to be unevenly placed in the molding. The molding formed by this method provides a superior product for keeping dirt, water and noise from passing the edge of the window, which is of particular importance in sound automotive design. The improved seal also minimizes wear on the painted body surfaces adjacent the molding by reducing rubbing found in conventional moldings. Such moldings thus provide a resilient seal between the molding and any of the translucent members described above.

Accordingly, it is a principal object of the invention to provide a decorative body side molding incorporating a resilient polymeric strip to apply pressure against an adjacent window without imposing a permanent set in the molding.

It is a further object to provide a decorative molding having a similar resilient polymeric strip to serve as a seal between the molding and a body panel when used as a reveal or lamp closeout.

It is another object to improve the sound, water and dirt sealing between the molding and adjacent members, and to minimize rubbing and wearing of painted surfaces.

It is another object to apply the polymeric member in the form of a continuous strip along one surface of the molding in a simple, economical manner, free of adhesives.

These and other objects, features and details of the invention will become apparent from the embodiments presented in the following specification, drawings, and claims.

DESCRIPTION OF THE DRAWINGS

FIG. 1 is a perspective view of a typical automobile illustrating the various locations of the novel decorative molding.

FIG. 2 is a sectional view of a typical body side molding, taken along line 2—2 of FIG. 1.

FIG. 3 is a sectional view of a typical reveal molding, taken along line 3—3 of FIG. 1.

FIG. 4 is a schematic view of the system of applying the foam strip to the molding of FIG. 2.

FIG. 5 is a schematic view similar to FIG. 4, illustrating the application of the foam strip to the molding of FIG. 3.

DESCRIPTION OF THE PREFERRED EMBODIMENTS

FIG. 1 illustrates a typical automobile 11 having a door panel 12 on which is mounted a moveable window 13, and a fixed body panel 14 on which is mounted a fixed window 15. Body side moldings 16 and 17, also known as beltline seals, are mounted on the door panel and body panel. FIG. 2 is a sectional view of the molding 16 which is mounted on the door panel 12 by conventional means, such as adhesive. This is identical in construction to molding 17, the molding thus being useable in conjuction with a moveable window 13 or a fixed window 15. The molding is formed of an elastomeric member such as polyvinyl chloride. The molding is multi-surfaced and has a principal portion including a leg 18 having a hook-shaped portion 19 which fits over the upper portion of the panel 12, this principal portion having a hardness of about 45 to 65 Shore D. If desired, the outer surface of the portion 19 may have a decorative covering 20, such as a bright Mylar. Extending outwardly and upwardly from the leg 18 are two arms 21 and 22 which provide contact with the surface of the window 13. These arms are also made of a similar polyvinyl chloride material, but have a hardness of about 75 to 95 Shore A, softer than the material of the principal portion, the arms thus providing a flexible contact against the window. The surfaces of the arms which contact the window may, if desired, have a flocking in order to provide a better contact surface. The molding is formed by co-extruding the principal portion and the arms in a manner well-known in the art.

The principal feature of the invention resides in the generally cylindrical resilient polymeric foamed strip or bead 23 having a closed cell foam structure throughout its entire cross-section, which is located between the leg 18 and the arm 22, and is bonded to the vee-shaped intersection which is formed by both of the members by the process illustrated in FIG. 4. The strip 23 may be formed of such material as silicone, EVA, SBR, polyvinyl chloride, urethane or nitrile, all foamed by a process described below. The strip thus applied will apply pressure against the arm 22, which in turn provides pressure against the window, thus minimizing the possibility that dirt, water and noise may bypass the window and enter vehicle. This firm seal also minimizes rubbing and wearing of the paint on the adjacent panel. The density of the foam strip may be controlled during the process to fit the specifications imposed by the vehicle manufacturer, preferably between 0.3 and 3.5 pounds per cubic foot.

Referring again to FIG. 1, the automobile 11 also utilizes a windshield molding 31, also called a reveal molding, which is used to retain the windshield as well as to conceal the space between the windshield and the adjacent body panel. A similar molding, not shown, may be applied to the rear window. Similar moldings 32 and 33 may be used as closeouts around the headlamps adjacent the glass or plastic lamp covers for similar purposes. A similar molding 34 is shown applied to the tail lamp, as well as one (not shown) on the other side, for the same purposes.

FIG. 3 is a sectional view of molding 31, which is typical of the other reveal and closout moldings referred to, this molding used in association with the windshield 35 attached to the body panel 36 by means of adhesive 37. The molding 31 is made of an elastomeric material similar to that described with reference to molding 16, and my be extruded with one or more hardnesses described with reference to molding 16, or a single hardness, or may be made as described in the Gross patent referred to above. The molding is multi-surfaced, and consists of a principal portion 38 having a side wall 46 and an outer section 39 with one end 40 contacting panel 36 and the other end 41 contacting an edge of the windshield. The inner surface 42 of the end 41, and the inner surface of a lower leg 44, grip the edge of the windshield. The novel feature of the invention is the generally cylindrical resilient polymeric foamed strip 45, identical to strip 23, which is bonded to one surface of the principal portion 38 and is slightly compressed as shown to form a seal against the body panel 36 for the same reasons discussed with respect to molding 16; namely, to minimize leakage of dust and noise, and to reduce rubbing and wear of the paint on the body panel.

The strips 23 and 45 may be formed by using a commercial system such the "Foam Mix" system marketed by Nordson Corporation of Westlake, Ohio. This system utilizes polymeric material from a bulk container which pumps it into a mixer, where it is mixed with a gas. The mixture is then fed into a dispenser, the gas bubbles forming a closed cell foam product which is then dispensed to form the continuous strip 23 or 45 as shown in FIGS. 2 and 3 having a closed cell foam structure throughout its entire cross-section. The density of the foamed product may be controlled by adjusting the amount of gas which is added. A preferred material is Dow Corning 732, a silicone which may be mixed and applied at room temperature. This material provides satisfactory stability at a wide temperature range, does not harden, crack or cruble, and is resistant to atmospheric pollutants. This material adheres well to the moldings.

A preferred method of applying the foam product is shown in FIGS. 4 and 5. In FIG. 4 the molding 16 is placed on a conveyor belt which travels in the direction shown by the arrow. The mixing machine 52, such as described above, has a dispensing nozzle 53 which dispenses the foamed material 54 into the space between arm 22 and leg 18 so that a continuous strip 23 is formed and bonded to the surfaces of the arm and the leg. This provides for a simple and economic method of application, the strip not requiring additional adhesives. The foam product is applied to molding 31 in a similar manner, as shown in FIG. 5. The molding is placed on the conveyor belt 51, and the mixing machine 52 dispenses the foamed polymeric material 54 through nozzle 53 to form the continuous strip 45 against the surface of side wall 46 of portion 38, to which it is bonded without requiring additional adhesive.

The specific shapes of the molding 16 and 31 are merely exemplary, and modification of these moldings may be made within the spirit of the invention.

We claim:

1. In a motor vehicle body having a body panel, an adjacent translucent member, and an elongated polymeric multi-surface molding adapted to conceal the space between said body panel and an edge of said translucent member; the improvement comprising a resilient polymeric strip bonded to the surface of said molding and free of additional adhesive, said strip having a closed cell foamed structure throughout its entire cross-section.

2. The molding of claim 1 wherein said strip is in the form of a continous generally cylindrical member applied along substantially the entire length thereof.

3. The molding of claim 1 wherein said strip is comprised of a closed cell foamed silicone.

4. The molding of claim 1 wherein said strip has a density of between 0.3 and 3.5 pounds per cubic foot.

5. The molding of claim 1 comprising a first portion adapted to be mounted on said body panel and a second portion adapted to contact said translucent member, said strip being bonded to said first and second portions and for applying pressure to said second portion to provide a seal against said translucent member.

6. The molding of claim 5 wherein said second portion extends upwardly and outwardly from said first portion and forms a generally vee-shaped intersection therewith, said strip located within said intersection.

7. The molding of claim 5 wherein said first portion of said molding has a surface which is opposite said translucent member, and a decorative covering mounted on said surface.

8. The molding of claim 1 wherein said strip is adapted to contact said body panel and to form a compressive seal between said molding and said body panel.

9. The molding of claim 8 wherein one segment of said molding has a surface adjacent to said body panel, said strip being bonded to said surface to form said compressive seal.

* * * * *